UNITED STATES PATENT OFFICE

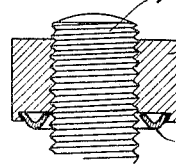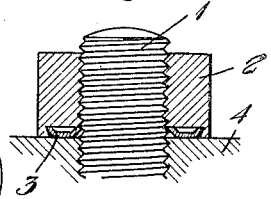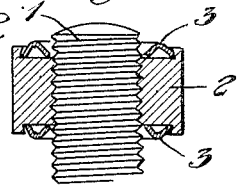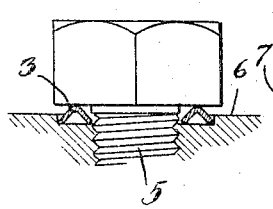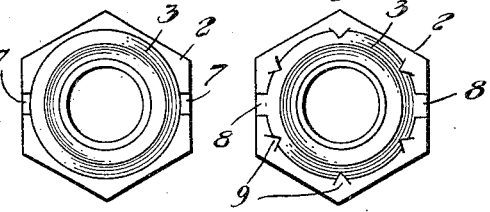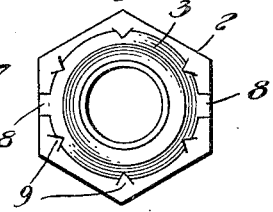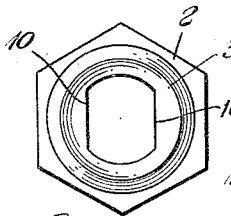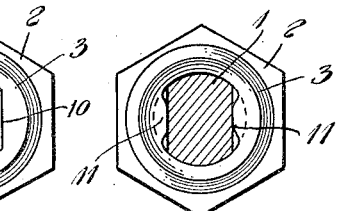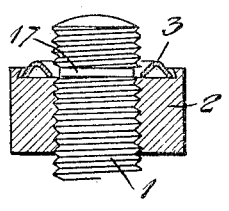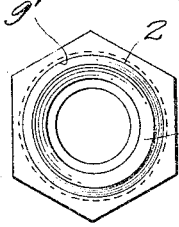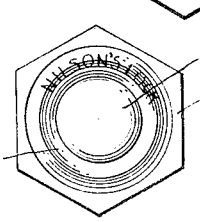

NILS DAVID NILSON, OF STOCKHOLM, SWEDEN, ASSIGNOR TO PATENTAKTIEBOLAGET VELOCK, OF STOCKHOLM, SWEDEN, A JOINT-STOCK COMPANY OF SWEDEN

LOCKING DEVICE FOR NUTS AND SCREWS

Application filed September 18, 1928, Serial No. 306,708, and in Sweden September 23, 1927.

The present invention provides for an extremely simple and at the same time reliable device for the locking of nuts, bolts and screws. The locking member proper is extremely simple as is also the manner in which it is applied and, furthermore, the application of the locking member to a nut does not alter the ordinary standard form of the nut to any appreciable extent, and in some cases does not even change its appearance. Locking may be effected not only of a nut, but of a bolt or screw as well. For instance, when the bolt or screw is thrust through an opening with a loose fit, and rotatable if desired, turning of same may be prevented with the aid of the locking device.

The invention contemplates a member which is preferably annular and of V-shaped or similarly channelled cross-section, which member when applied to a nut bears against the latter with the two annular edge portions of the V-section. The outer annular edge portion is supported from the outside so as to have a fixed bearing while the inner annular edge portion is slidable inwardly along a supporting surface (a face of the nut, for example). It will thus be seen that with the annular apexial ridge of the V-section bearing against the abutment for the nut when the nut is screwed on, tightening of the nut against such abutment will cause the inner annular edge portion to slide against the bolt or screw and in contact with the abutment so as to be forced into the screw-threads. If desired, the locking member may instead be arranged in the abutment and function in the same manner.

In the accompanying drawings illustrating the invention, in the several figures of which like parts are similarly designated, Fig. 1 is a fragmentary sectional elevation of a bolt and nut with the locking device of my invention applied thereto.

Fig. 2 is a view showing the parts of Fig. 1 with the nut tightened to a seat against an abutment member and the locking device deformed into locking engagement with the screwthreads of the bolt.

Fig. 3 is a view similar to Fig. 2 but with the position of the nut reversed and the locking device in undeformed condition.

Fig. 4 is a view similar to Fig. 1 but showing both faces of the nut provided with locking devices.

Fig. 5 illustrates the application of the locking device to an abutment member for cooperation with a cap screw.

Figs. 6, 7, 8 and 9 illustrate various forms which the locking device may take and the complemental formation of the nut and bolt for cooperation therewith.

Fig. 10 is a view similar to Fig. 1 but illustrating a further modification.

Fig. 11 is a plan view of the ring provided with a radial split.

Fig. 12 is a plan view illustrating the ring as of two-part formation.

Fig. 13 is a plan view of a modified form of retaining means for the ring.

Fig. 14 is a plan view illustrating the manner of identifying or sealing a locked nut by stamping.

Referring to Figs. 1 and 2, 1 designates the bolt or screw, 2 the nut, and 3 the locking member. This latter preferably consists of a closed ring which, whether it be loose or secured in the nut, may be thrust onto the screw from the end thereof. The ring may be split radially or otherwise at the circumference, as indicated at 3′ in Fig. 11 and may be of such resiliency as to permit of its being moved onto the screw from the side when strained apart. Likewise, the ring may be divided into two or more parts or segments adapted to be placed adjacent to each other as shown in Fig. 12. According to Fig. 1, the ring 3 is secured in the nut 2, and is of V-shaped cross-section. The ring encircles the bolt or screw 1 and enters a recess provided in the nut and has the inner and outer annular edges of its cross-sectional V-shaped legs bearing against the bottom of the said recess. The outer annular edge of the ring enters the overhang of the circumferentially beveled wall of the recess and the ring is thus secured therein and supported at its outer periphery. When the nut with the locking ring secured in the above-mentioned manner is screwed onto the bolt or screw 1 and the nut is tightened up against the abutment 4, as shown in Fig. 2, the locking ring 3 will be squeezed between the abutment and the nut. Inasmuch as the outer annular edge of the ring is rigidly supported by the wall of the recess, as described, it cannot yield radially outwardly when deformed by pressure applied to it, but is so deformed that its inner annular edge slides over the bottom surface of the recess radially toward the bolt or screw 1 and powerfully penetrates into the threads thereof. Thus the nut is locked onto the bolt or screw. At the same time the outer annular edge of the ring which abuts against the wall of the recess is firmly pressed against the material of the nut and into locking engagement with same. Thus the nut and the ring cannot turn relatively to each other. When squeezed the ring functions substantially in the same manner as a toggle having its fulcrum at the apex of the V (cross-section considered), the inner and the outer annular edges of the ring being in effect spread apart radially around the circumference and pressed against the screw and the nut respectively, while the middle portion or apex of the V-section is at the same time depressed toward the bottom surface of the recess in the nut. As will be seen, the depth of the recess is less than the distance between a plane in contact with the annular edges of the ring and a plane in contact with its annular apexial ridge but greater than the thickness of the material of which the ring is formed. Thus when the ring is deformed, as shown in Fig. 2, it still retains its resiliency and an arch shape.

In Fig. 3, the locking device is shown as being on the outer or upper side or face of the nut, in which case this outer or upper side or face is provided with the recess receiving the ring. After the nut provided with the locking device has been screwed onto the bolt or screw, a ring-deforming member or tool, preferably an ordinary nut may be screwed onto the same, whereby the ring is squeezed or deformed so as to cause its inner annular edge to penetrate into the screwthread of the bolt or screw.

In the modification illustrated in Fig. 4, both sides or faces of the nut are provided with recesses having rings 3 inserted therein. The inner one of these rings will be squeezed and firmly pressed into the screw and the nut when the latter is tightened up as described with reference to Figs. 1 and 2. The outer ring is deformed in the manner of the ring of Fig. 3. Thus the locking according to Fig. 4 will act twice as powerfully as the previously described arrangements where a single ring is used. The arrangement according to Fig. 4 is also particularly advantageous in that, if the nut fits the bolt or screw with a loose fit, as is often the case, the rings 3 when squeezed together and deformed will be pressed into the threads of the screw so tightly that the loose fit is cured. In this way the nut will be comparable with a well fitting, so-called precision nut, and the rings will eliminate any play which might otherwise be present.

In Fig. 5 the arrangement is shown as applied to the locking of a cap screw 5. The abutment or part 6 into which the screw is driven, is then provided with the recess adapted to receive the locking ring 3. When the screw is tightened up, the ring will be squeezed between the screw head and the bottom of the recess, and will thus be firmly pressed and deformed so that its inner and outer annular edges penetrate into the screw threads and into the part 6 respectively, the screw being thus locked.

Fig. 6 shows one end surface or face of a nut provided with a recess to which the locking ring is fitted and having the ring inserted in same. In this form of nut the wall at diametrically opposite sides of the recess is provided with slots 7, preferably of such a depth that their bottoms will lie flush with the bottom of the recess. The object of the slots 7 is to facilitate removal of the ring 3 from the nut. This is effected with the aid of a tool which is inserted into one of the slots and beneath the edge of the ring 3, which latter is then pried out of the recess by means of the tool. Thus it will be easy to replace a used locking ring by a new ring, and the locking device may thus be renewed, when required, without the nut proper having to be discarded.

Fig. 7 partly shows substantially the same arrangement as Fig. 6 but in this form the locking ring 3 is provided with lugs 8 which enter the slots 7, thus providing a rigid connection between the nut and the locking ring so that the latter cannot be turned in the nut. The locking action will thus be more secure. A rigid connection betwen the nut and the locking ring may also be provided by pressing in laps or ears 9 from the edge of the recess of the nut, or if desired the edge may be pressed in all around, so that the pressed-in portion bears against and retains the ring as indicated at 9', Fig. 13.

In Fig. 8 I show another arangement for making the locking secure. In this arrangement the opening in the ring 3 to receive the bolt or screw is provided with two diametrically opposite straight edges 10 paralleling each other. The bolt or screw is formed with flattened portions corresponding to the edges 10. In using this form of ring, the same is first thrust onto the bolt or screw and cannot be turned on the latter, for the reason that the edges 10 engage with the flattened portions of the bolt or screw. When the nut is screwed on, the ring is squeezed and depressed in the manner previously described and is firmly pressed against the nut and the bolt or screw. Thus the special interengaging adaptation of the locking ring and the bolt or screw, as well as the jamming fast of the ring, aids in the locking of the nut when the latter is tightened up.

As shown in Fig. 9 the bolt or screw 1 is flattened in the maner described with reference to Fig. 8 but the opening of the ring 3 is circular. In this case, the fitting of the ring on the screw is brought about by portions 11 of the inner edge of the ring being pressed to bear on the flattened portions of the bolt or screw.

In Fig. 10 I have shown the bolt or screw 1 provided with a circumferential groove 17 into which the inner annular edge of the locking ring 3 is forced when the ring is depressed.

In addition to the above-mentioned advantages of the invention, the following may be set forth in particular:

The arrangement permits absolute locking of the nut or of the bolt or screw in any position.

The nut may be locked and tightened at both end surfaces, which is of great importance, particularly if the fit of the nut is loose. Likewise, tightening is obtained about the screw.

The locking device may also be advantageously used in so-called cap nuts.

The nut may be removed from one screw onto another of approximately the same diameter, and in case satisfoctory locking would not then be obtainable, the locking rings may be readily replaced by new rings. When a locked nut is unscrewed and again screwed up, the locking ring may be easily removed and replaced by a new one if it does not function properly to lock the parts.

The nut need not be produced out of heavy material and it need not be made of a height exceeding the ordinary, but maintains its standard dimensions and appearance.

The locking device, which may be made of metal in all parts, is for this reason not injured by high temperatures, as distinguished from friction-locked nuts where the locking part consists, for instance, of fibre or rubber.

A two-fold security for the locking may be brought about by the nut permitting of being locked at both end surfaces and by the locking ring being pressed into engagement with the threads and the nut, as well as permitting of being connected with the nut or the screw, or with both.

Unscrewing of a locked nut does not call for the use of a special tool, but may be effected with the aid of an ordinary wrench.

The device is extremely simple and inexpensive, inasmuch as the locking member proper may be produced in the simplest possible manner by pressing or stamping.

After locking has been effected, a mark, firm name or the like may be stamped on the locking member or ring, particularly when this member or ring is fitted on the outside of the nut, which mark or the like then forms a seal indicating that the nut has emanated in locked condition from a certain place of manufacture as illustrated in Fig. 14.

Various changes are contemplated as permissible within the spirit of the invention and the scope of the following claims.

I claim:—

1. Means for locking a nut relatively to a bolt and a part secured thereby, comprising a resilient ring of V-shaped radial cross-section having inner and outer annular edges and an apexial ridge intermediate said edges, said edges lying in a plane normal to the axis of said ring and the apex of said ridge lying in a spaced parallel plane, a recess formed in one face of the nut and of a depth less than the space between said planes and having its outer peripheral wall provided with an overhang, said resilient ring being positioned in said recess with its annular edges in contact with the bottom of said recess, its outer annular edge abutting against the outer periphery of the recess and beneath its overhang, whereby when the nut is tightened against the secured part the apexial ridge will engage said part and said ring will be deformed so that its inner annular edge will slide along the bottom of the recess and will penetrate and engage with the threads of the bolt, the depth of said recess relatively to the thickness of the material of said ring preventing complete distortion of the ring and insuring maintenance of its resiliency.

2. Means for locking a nut relatively to a bolt and a part secured thereby, comprising a ring of V-shaped radial cross-section having inner and outer annular edges and an apexial ridge intermediate said edges, said edges and said ridge lying in separate spaced parallel planes, a recess formed in one face of the nut and of a depth less than the space between said planes and having its outer peripheral wall provided with an overhang, said ring being positioned in said recess with its annular edges in contact with the bottom of said recess, its outer annular edge abutting against the outer periphery of the recess and beneath its overhang, whereby when the nut is tightened against the secured part the apexial ridge will engage said part and said ring will be deformed so that its inner annular edge will slide along the bottom of the recess and will penetrate and engage with the threads of the bolt, and means for permitting removal of said ring from said nut including a notch formed in said nut and communicating with said recess.

In testimony whereof I affix my signature.

NILS DAVID NILSON.